(12) United States Patent
Pramberger-Schriebl et al.

(10) Patent No.: US 12,259,497 B2
(45) Date of Patent: Mar. 25, 2025

(54) OPTICAL INTERFERENCE FILTERS

(71) Applicant: ams AG, Premstaetten (AT)

(72) Inventors: David Josef Pramberger-Schriebl, Eindhoven (NL); Gerhard Eilmsteiner, Eindhoven (NL); Hannes Brandner, Eindhoven (NL)

(73) Assignee: AMS AG, Premstaetten (AT)

( * ) Notice: Subject to any disclaimer, the term of this patent is extended or adjusted under 35 U.S.C. 154(b) by 952 days.

(21) Appl. No.: 17/415,301

(22) PCT Filed: Dec. 3, 2019

(86) PCT No.: PCT/EP2019/083543
§ 371 (c)(1),
(2) Date: Jun. 17, 2021

(87) PCT Pub. No.: WO2020/126485
PCT Pub. Date: Jun. 25, 2020

(65) Prior Publication Data
US 2022/0018938 A1 Jan. 20, 2022

Related U.S. Application Data (60) Provisional application No. 62/872,629, filed on Jul. 10, 2019, provisional application No. 62/781,104, filed on Dec. 18, 2018.

(51) Int. Cl.
  G01S 7/481 (2006.01)
  G01S 17/86 (2020.01)
  G02B 5/28 (2006.01)
(52) U.S. Cl.
  CPC ............. *G01S 7/4811* (2013.01); *G01S 17/86* (2020.01); *G02B 5/285* (2013.01)

(58) Field of Classification Search
  CPC ...... G01S 7/4811; G01S 17/86; G01S 7/4876; G01S 7/4814; G01S 7/4816; G01S 17/04;
  (Continued)

(56) References Cited

U.S. PATENT DOCUMENTS

| 7,262,131 B2 * | 8/2007 | Narasimhan ...... H01L 21/31608 257/E21.279 |
| 11,022,733 B2 * | 6/2021 | Eisenhammer ......... C23C 14/35 |

(Continued)

FOREIGN PATENT DOCUMENTS

| CN | 102299165 A | 12/2011 |
| CN | 103443670 A | 12/2013 |

(Continued)

OTHER PUBLICATIONS

Chinese Office Action for corresponding CN Application No. 201980084442, dated May 25, 2023, pp. 1-27.
(Continued)

*Primary Examiner* — Daniel L Murphy
(74) *Attorney, Agent, or Firm* — VIERING, JENTSCHURA & PARTNER mbB (57) ABSTRACT

An optical device includes an emitter operable to emit a first light wave. The optical device also includes a detector operable to detect a second light wave that is based on the first light wave. The second light wave is susceptible to being coupled with an undesired light wave that is based on the first light wave. The optical device further includes an interference filter disposed on the detector. The interference filter includes a first filter portion and a second filter portion having a first set of layers formed from a first material and a second set of layers formed from a second, different material. The interference filter is operable to attenuate
(Continued)

undesired light waves in multiple distinct environments based on the first and second sets of layers in the second filter portion.

16 Claims, 7 Drawing Sheets

(58) Field of Classification Search
CPC .... G02B 5/285; G01J 3/51; G01J 2003/1226; G01J 1/0488; G01J 1/06; G01V 8/12; G01D 5/30
USPC ......................................................... 356/4.01
See application file for complete search history.

(56) References Cited

U.S. PATENT DOCUMENTS

| | | |
|---|---|---|
| 2011/0204233 A1 | 8/2011 | Costello et al. |
| 2013/0327931 A1 | 12/2013 | Hsu et al. |
| 2016/0238759 A1 | 8/2016 | Sprague et al. |
| 2017/0117498 A1 | 4/2017 | Takechi et al. |

FOREIGN PATENT DOCUMENTS

| | | |
|---|---|---|
| CN | 104471449 A | 3/2015 |
| CN | 106935595 A | 7/2017 |
| DE | 102017004828 A1 | 11/2018 |
| JP | 2005266069 A | 9/2005 |
| WO | 2013184556 A1 | 12/2013 |
| WO | 2018077870 A1 | 5/2018 |

OTHER PUBLICATIONS

Yuan Chen et al., "Research on multispectral color sensor based on vertical stacking structure", Spectroscopy and Spectral Analysis vol. 27, No. 5, May 2007, pp. 837-841, 8 pages of the translation, 5 pages of the original.

Chinese Notice of Allowance issued for the corresponding CN patent application No. CN 201980084442.X dated Feb. 8, 2024, 5 pages (For informational purposes only).

* cited by examiner

OPTICAL INTERFERENCE FILTERS

RELATED APPLICATIONS

The present invention is a U.S. National Stage under 35 USC 371 patent application, claiming priority to Serial No. PCT/EP2019/083543, filed on 3 Dec. 2019; which claims priority of U.S. Provisional Application Ser. No. 62/781,104, filed on 18 Dec. 2018; and U.S. Provisional Application Ser. No. 62/872,629, filed on 10 Jul. 2019 the entirety of which are incorporated herein by reference.

FIELD

This specification relates to filters for optical sensing devices.

BACKGROUND

Integrated circuits (ICs) may include various components for use in sensing apparatus such as optical sensing devices. One example of such an IC uses a package having a light emitter and a photodetector in order to produce and detect light. More specifically, in some cases, light may be produced by the emitter and be reflected from an object back to the photodetector. The photodetector produces a representation (e.g., an electrical signal) of the detected light. The electrical signal or representation may be processed and used as desired to obtain information about the object. Sensing apparatus, such as devices for proximity sensing, presence detection, motion detection, and color detection, frequently use such optical sensing methods to obtain information about an object.

The information that is obtained can include a color of the object, relative motion of the object, or approximate distance of the object relative to the sensing apparatus. Reflected light that carries information about the object is susceptible to interference from undesired light waves. Optical interference filters leverage filter transmission technology to attenuate or block the undesired light waves from reaching the photodetector, while permitting the reflected light to be detected by the photodetector. Transmission characteristics of interference filters can be tailored to a variety of application-specific needs. Some interference filters are comprised of certain layer materials that cause the filters to exhibit certain structural deficiencies that compromise reliability and robustness of the filters.

SUMMARY

This document describes an optical sensing device that includes an internal cavity and an emitter disposed in the internal cavity. The emitter is operable to emit a first light wave. The optical device also includes a detector disposed in the internal cavity. The detector is operable to detect a second light wave that is based on the first light wave emitted by the emitter. The second light wave is susceptible to being coupled with an undesired light wave that is also based on the first light wave emitted by the emitter.

The optical device further includes an interference filter positioned or disposed on the detector. The interference filter has a multi-layer configuration that is operable to attenuate the undesired light wave, while also being resistant to delamination, or other structural damage, that can occur when the interference filter is exposed to certain environmental conditions. The multi-layer configuration is comprised of materials that are environmentally robust. The described interference filter is operable to have sensitivity to particular angles of incidence of light.

In some examples, the interference filter is designed to include layer materials that have a high refractive index, such as amorphous silicon or hydrogenated amorphous silicon. Such materials can provide a low angle shift (LAS) filter that operates in the near infrared (NIR) spectrum. The described methods including using an alternating stack of high and low refractive materials to improve the physical stability and reliability of optical interference filters that are comprised of hydrogenated amorphous silicon (a-Si:H).

One aspect of the subject matter described in this specification can be embodied in an optical device. The optical device includes an emitter operable to emit a first light wave; a detector operable to detect a second light wave that is based on the first light wave, wherein the second light is susceptible to being coupled with an undesired light wave that is based on the first light wave; and an interference filter disposed on the detector. The interference filter includes: a first plurality of alternating layers that are formed using a first set of materials; and a second plurality of alternating layers that are formed using a second set of materials, wherein the second plurality of alternating layers corresponds to at least one filter property of the interference filter, and the at least one filter property is operable to cause the interference filter to attenuate the undesired light wave while being resistant to an environmental condition that would otherwise cause physical deformation of the interference filter.

These and other implementations can each optionally include one or more of the following features. For example, in some implementations, the second plurality of alternating layers represents an additional layer stack of the interference filter, the additional layer stack being comprised of a plurality of dielectric layers arranged in a stacked configuration.

In some implementations, the additional layer stack corresponds to the filter property, the filter property being operable to cause the interference filter to have immunity to one or more environmental conditions that would otherwise cause physical deformation of one or more layers included in the first plurality of alternating layers.

In some implementations, the second plurality of alternating layers includes a plurality of dense dielectric layers arranged in a stacked configuration; and each dense dielectric layer of the plurality of dense dielectric layers is disposed on a surface of the detector. In some implementations, the dense dielectric layers that are disposed on the surface of the detector are operable to reduce a number of potential paths through which water or water vapor travels to one or more portions of the interference filter.

In some implementations, the filter property is operable to cause the interference filter to attenuate the undesired light wave based on an angle of reflection of the undesired light wave, the angle of reflection of the undesired light wave being relative to a surface of the detector. In some implementations, the filter property is operable to cause the interference filter to: attenuate the undesired light wave; be resistant to a first environmental condition that would otherwise cause physical deformation of the first plurality of alternating layers; and be resistant to a second, different environmental condition that would otherwise cause physical deformation of the first plurality of alternating layers.

In some implementations, the first environmental condition is based on water or water vapor; and the second, different environmental condition is based on a particular type of fluid or gas. In some implementations, the first environmental condition is based on a temperature of the environment exceeding a threshold temperature; and the second, different environmental condition is based on a process by which the detector was enclosed in a device package. In some implementations, the filter property of the interference filter is based on a composition of layers that form a protective layer stack using the second plurality of alternating layers. In some implementations, the interference filter includes a protective layer stack formed using the second plurality of alternating layers; and the optical device is a proximity sensor operable to detect a proximity of a target object relative to the optical device.

Another aspect of the subject matter described in this specification can be embodied in a host device comprising an optical device as described above. The host device includes one or more processing devices; and one or more non-transitory machine-readable storage devices storing instructions that are executable by the one or more processing devices to cause performance of operations comprising: receiving one or more signals from the detector; and adjusting a feature of the host device in response to receiving the one or more signals from the detector.

Another aspect of the subject matter described in this specification can be embodied in a method performed using an optical device. The method includes: emitting, by an emitter disposed in the optical device, a first light wave that results in an undesired light wave in the optical device; detecting, by a detector disposed in the optical device, a second light wave that is based on the first light wave, wherein the second light wave is susceptible to being coupled with the undesired light wave; and filtering, using an interference filter disposed on the detector, the undesired light wave caused by the first light wave. Filtering the undesired light wave comprises attenuating the undesired light wave based on at least one filter property of the interference filter. The at least one filter property is operable to cause the interference filter to: attenuate the undesired light wave; and have resistance to one or more environmental conditions that would otherwise cause physical deformation of the interference filter.

These and other implementations can each optionally include one or more of the following features. For example, in some implementations, attenuating the undesired light wave based on the filter property of the interference filter comprises: attenuating the undesired light wave using a plurality of alternating layers that represent an additional layer stack of the interference filter.

In some implementations, the additional layer stack is comprised of a plurality of dielectric layers arranged in a stacked configuration, and the plurality of dielectric layers are operable to cause the interference filter to have resistance to one or more environmental conditions that would otherwise cause physical deformation of the interference filter.

Another aspect of the subject matter described in this specification can be embodied in an optical device. The optical device includes an emitter operable to emit a first light wave; a detector operable to detect a second light wave that is based on the first light wave; and an interference filter disposed on the detector, the interference filter comprising: a first plurality of alternating layers that are formed using a first set of materials; and a second plurality of alternating layers that are formed using a second set of materials, the second plurality of alternating layers represents a protective layer stack of the interference filter.

Another aspect of the subject matter described in this specification can be embodied in an interference filter disposed on a detector of an optical device. The interference filter includes: a first plurality of alternating layers that are formed using a first set of materials, at least one material in the first set of materials comprising amorphous silicon or hydrogenated amorphous silicon; and a second plurality of alternating layers that are formed using a second set of materials, at least one material in the second set of materials having a refractive index that is lower than a respective refractive index of the amorphous silicon or the hydrogenated amorphous silicon. The second plurality of alternating layers corresponds to at least one filter property of the interference filter, and the at least one filter property is operable to cause the interference filter to attenuate the undesired light wave while being resistant to an environmental condition that would otherwise cause physical deformation of the interference filter.

Other implementations of this disclosure and other aspects include corresponding systems, apparatus, and computer programs configured to perform the actions of the methods and encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Other aspects, features and advantages will become apparent from the following detailed description, the accompanying drawings, and the claims.

DETAILED DESCRIPTION

Optical sensors can include both an emitter and detector in a device package. The device package generally represents a physical device structure of an optical sensor or optical sensing device. The device package defines an internal cavity where the emitter and detector can be positioned. In general, the emitter emits a signal that interacts with a target object outside the package, which reflects a signal detectable by the detector. Each of the emitted signal and the reflected signal can be light waves, such as emitted and reflected rays of IR light, respectively. The emitted light wave signal can cause interference or crosstalk that result from undesired/interfering light waves in the internal cavity of the device package.

The undesired signal may couple with the reflected signal that is detectable by the detector and can degrade the optical device's ability to detect information about a target object accurately and reliably. The undesired signal may be referred to, alternatively, as crosstalk, optical crosstalk, system crosstalk, noise or background (light emitted from environment such as artificial light sources or sun light). Conventional optical devices may include an optical bather (sometimes called an optical isolator) disposed on the detector to reduce undesired or interfering light waves from being detected by the detector. However, these conventional optical bathers can be composed of materials that exhibit weakness when exposed to certain environmental conditions.

This document describes techniques for implementing an improved optical interference filter. The described techniques can be used to improve the physical stability and reliability of an optical interference filter that is comprised of hydrogenated amorphous silicon (a-Si:H). The filter is operable to filter undesired, or interfering, light waves that may degrade a detecting function of an optical sensing device. In particular, techniques are described for effectively leveraging a multiple layer configuration of an interference filter to attenuate or block undesired light waves (or system crosstalk) from degrading the detecting function of a detector. The detector can be a photodiode that is disposed adjacent an emitter in an internal cavity of an optical device.

The interference filter includes an alternating stack of a-Si:H thin films, representing high refractive materials, and silicon dioxide ($SiO_2$) thin films, representing low refractive materials. In some implementations, each thin film of a particular alternating stack corresponds to an additional stack of layers of the interference filter. In one example, the interference filter is deposited on a glass surface of a structure used to enclose a substrate of the detector that detects photons of a light wave (in some cases the interference filter can also cover the emitter substrate). In other implementations, the interference filter is deposited directly on the detecting device, such as the substrate layer of a detector, which is most commonly based on complementary metal-oxide-semiconductor (CMOS) technology.

Figure 1:
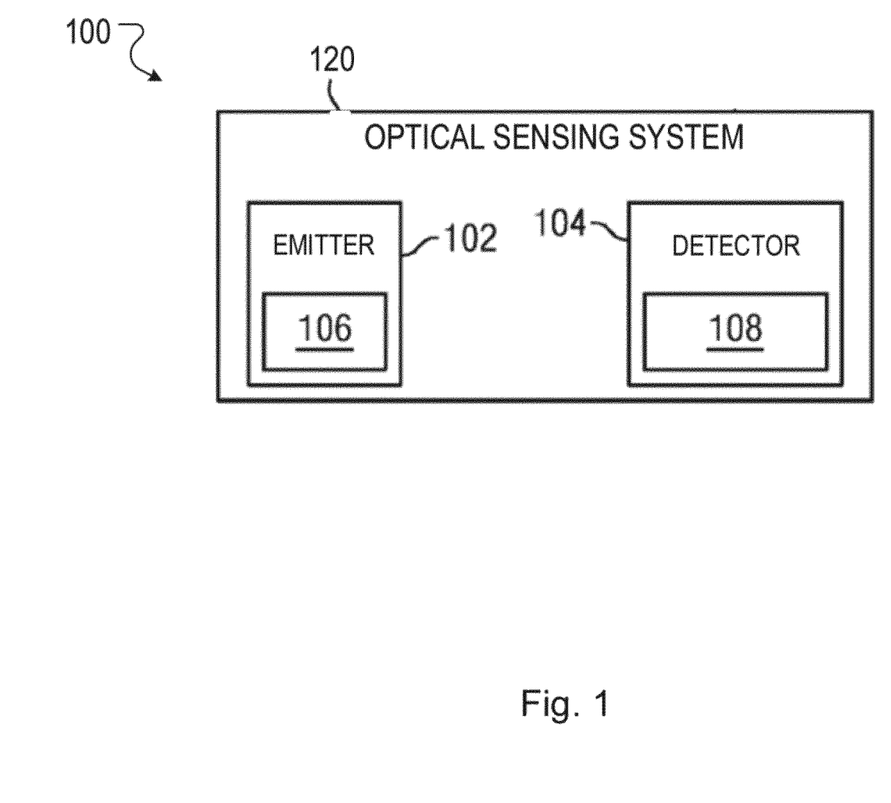
FIG. 1 is a block diagram of an example optical sensing system.

FIG. 1 is a block diagram of an example optical sensing system 100. System 100 can represent an integrated circuit (IC) or an optical device, such as one or multiple optical sensors or optical sensing devices. In some examples, the optical sensing device is a color detection sensor, and the reflected signal detected by the detector is used to determine a color of a target object (e.g., a person's head) relative to the optical device. For instance, the optical device may be disposed in a mobile/smartphone device, and the detected reflected signal is processed at the mobile device to determine whether the smartphone is positioned adjacent a person's ear. In some examples, these devices are used for proximity detection, time-of-flight (TOF) applications, or light detection and ranging (LIDAR) applications. In one example the detector is positioned in a camera to detect ambient light relative to an environment in which the camera is located.

In some implementations, an example optical sensing device described in this document is a camera (e.g., a digital camera). The described techniques for implementing the improved optical interference filter can include placing or depositing the alternating stack of layers that form the improved filter directly on (e.g., on top of) an image sensor of the digital camera or on a separate substrate that is in front of, in contact with, or directly adjacent the image sensor. The improved interference filter described herein can either be a structured filter (a discrete interference filter on respective pixels within a pixel array of the image sensor) or a plain deposition filter (the same interference filter covers all pixels within the pixel array of the image sensor).

System 100 includes an emitter 102, such as a light emitting diode (LED) or vertical-cavity surface-emitting laser (VCSEL), and a detector 104, such as a photodetector. In some cases, detector 102 is alternatively referred to as a sensor and may be a photodiode operable to sense (e.g., detect) light waves at a surface section of detector 104. Emitter 102 can be operable, for example, to generate a signal of a particular wavelength, and the detector 104 can be a sensor operable to sense the signal produced by the emitter 102. The emitter 102 and detector 104 may be disposed in, or otherwise located in, an optical device represented by system 100.

The emitter 102 can be configured to produce visible or non-visible light of a desired wavelength. For example, the emitter 102 can produce light waves that have a wavelength in the near-infrared (NIR) spectrum in the range of 750 nanometers (nm) to 1400 nm. As described in more detail below, in an example implementation, the emitter 102 produces light, and the detector 104 incorporates a filter to minimize the detector's response to light other than wavelengths produced by the emitter 102.

The emitter 102 can be fabricated directly onto an IC of system 100 or may include an IC chip or other modular component that is added to the IC of system 100 during or after fabrication of the IC. The emitter 102 may be a single emitter or may represent multiple emitters (e.g., an array of emitters). The detector 104 is configured to detect light of the wavelength produced by the emitter 102 (e.g., in the range of 850 nm to 940 nm). The detector 104 also may be fabricated directly onto an IC of system 100 or may include an IC chip or other modular component that is added to the IC of system 100 during or after fabrication of the IC. The detector 104 may be a single detector or may represent multiple detectors (e.g., an array of detectors).

A projection portion 106 can include circuitry of the emitter 102 that enables the emitter to generate an example light wave or related optical signal. Similarly, a detection portion 108 can include circuitry of the detector 104 that enables the detector to detect an example light wave or optical signal. In some implementations, system 100 is an optical sensor that includes both an emitter 102 and a detector 104 in a single device package 120. The device package 120 generally represents a physical device structure of an optical sensor or optical sensing device.

Figure 2A:
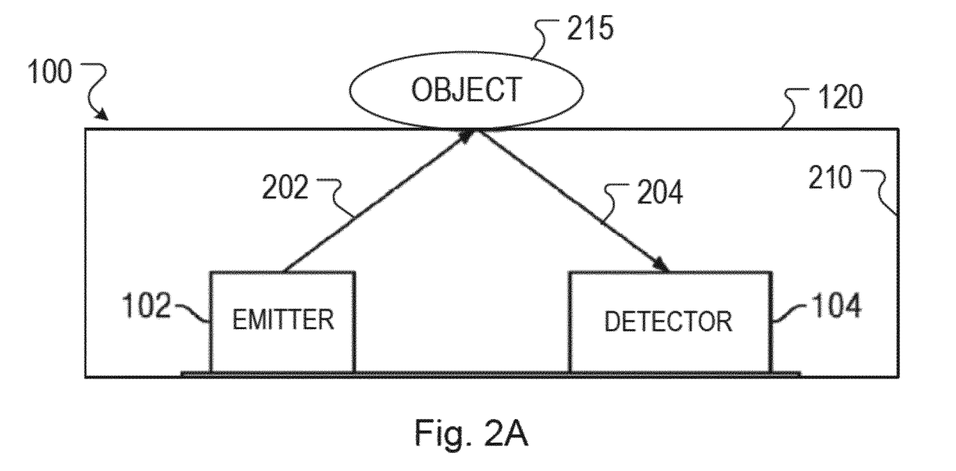
FIG. 2A is a block diagram of an example optical device that emits and detects a signal for sensing a target object.

FIG. 2A is a block diagram of an example optical device(s) represented by system 100. For purposes of example, emitter 102 and detector 104 may be used for a variety of applications, including presence detection, motion detection, color detection, and other related applications in which an emitted signal is later detected and processed or analyzed. In the implementation of FIG. 2A, the system 100 is an optical device that emits a signal for sensing a target object. The signal can correspond to an example light wave 202 that is associated with a reflected light wave 204.

As noted above, the optical device can include both the emitter 102 and detector 104 in a device package that defines an internal cavity 210. The light wave 202 emitted by emitter 102 interacts with a target object 215 to cause the reflected light wave 204. The target object 215 is external to the device package 120. In this manner, the emitted light wave 202 exits the internal cavity 210 of the optical device after being emitted for sensing the target object 215, and the reflected light wave 204 enters the internal cavity 210 of the optical device in response to the emitted light wave 202 interacting with the target object 215.

Figure 2B:
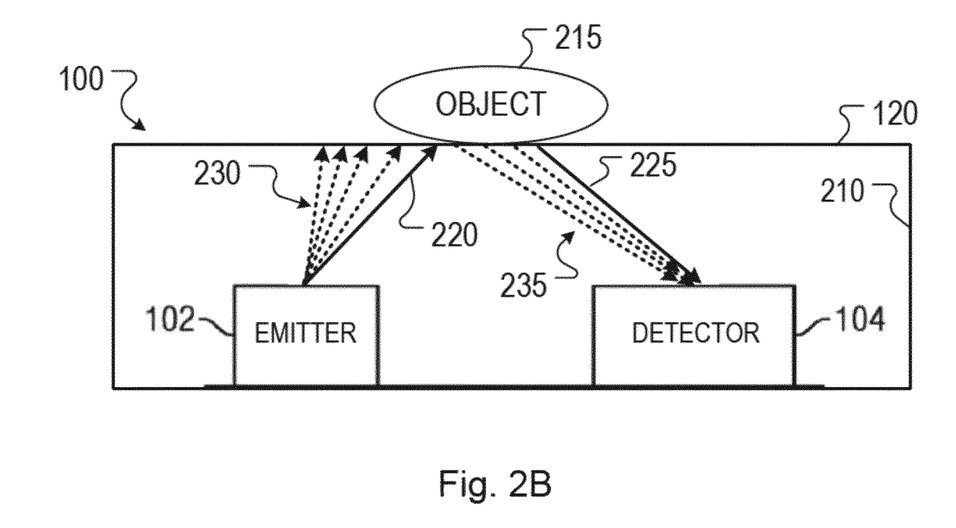
FIG. 2B is a block diagram of an example optical device emitting a signal that results in cross-talk at the optical device.

Referring now to FIG. 2B, in this implementation an optical device(s) represented by system 100 emits a signal corresponding to a light wave 220. The light wave 220 is emitted for sensing target object 215, and causes one or more light waves 225 to be reflected by the optical device. As described herein, the light wave 220 may have signal characteristics or attributes 230 that may result in cross-talk, interference, or undesired light waves at the optical device of system 100. For example, the emitted light wave 220 may have certain power and/or spectral attributes 230 that cause undesired light waves 235 to occur in the internal cavity 210 of the device package 120.

The undesired light waves are based on the emitted light wave 220 and can result in cross-talk or interference at the optical device. In some implementations, the undesired light waves 235 occur when one or more light waves 220 reflect off a portion of the device package 120 that forms the optical device. For example, undesired light waves 235 can occur when light wave 220 reflects off an inner wall associated with the internal cavity 210 of the device package 120. In other examples, undesired light waves 235 can occur when light wave 220 reflects off a glass surface of the device package 120.

Figure 3:
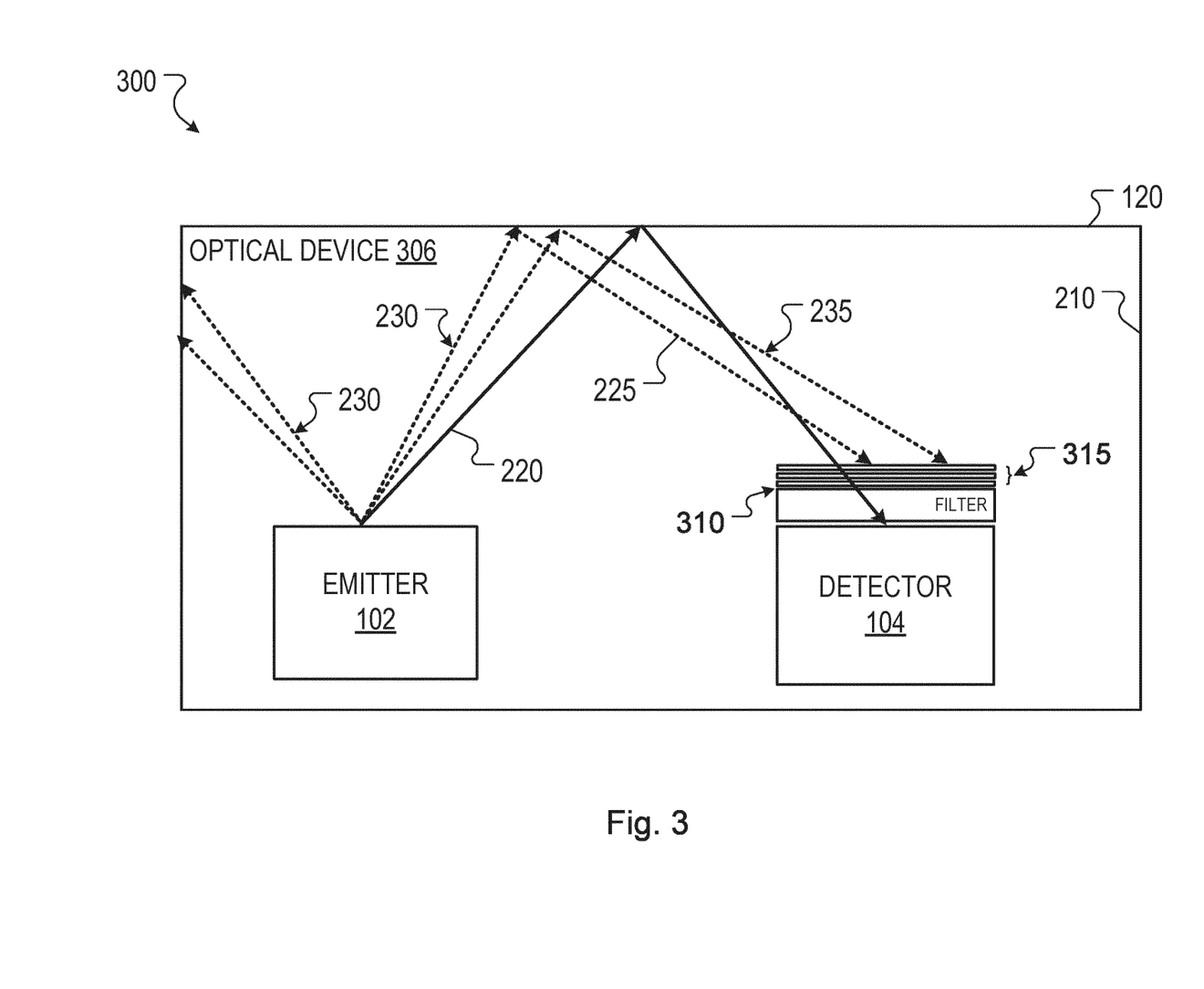
FIG. 3 is a block diagram of an example optical sensing device and an interference filter for reducing optical cross-talk.

FIG. 3 is a block diagram of an example optical sensing system 300. System 300 can represent one or more optical devices 306 that leverage the spectral transmission's angular dependency property of an interference filter 310 to reduce optical cross-talk caused by undesired light waves 235. In some cases, the spectral transmission's angular dependency property corresponds to a filter property of the interference filter. Interference filter 310 can be disposed on detector 104. In some implementations, interference filter 310 is placed on a glass portion of detector 104 or directly on a silicon substrate that forms an IC of detector 104, such as an IC of a photodiode or other photodetector.

In some implementations, interference filter 310 can be formed using at least two different materials that are particularly suited for attenuating signals that correspond to light waves having a certain angle of reflection. For example, each of the respective materials can have a different index of refraction that cooperates to define a filter property of the interference filter 310. The filter property is operable to cause the interference filter 310 to attenuate the undesired light waves 235 based on an angle of reflection of the undesired light waves 235. The filter property of the interference filter 310 can be based on a composition of layers 315 that form the interference filter.

The different materials of the interference filter 310 can be associated with respective layers 315 of the interference filter. Each of the respective layers 315 can have a particular thickness, a particular material composition, or both, and the layers may be arranged in a stacked configuration. In some implementations, a thickness of the materials at each layer can be varied or adjusted so as to control an amount of light that is received or detected by the detector 104 and to control an amount of undesired light that is blocked from detection by the detector 104. In some cases, the interference filter 310 can have up to one hundred fifty layers 315 of the light refracting material. In other cases, the interference filter 310 can have more than one hundred fifty layers 315 of the light refracting material.

Figure 4:
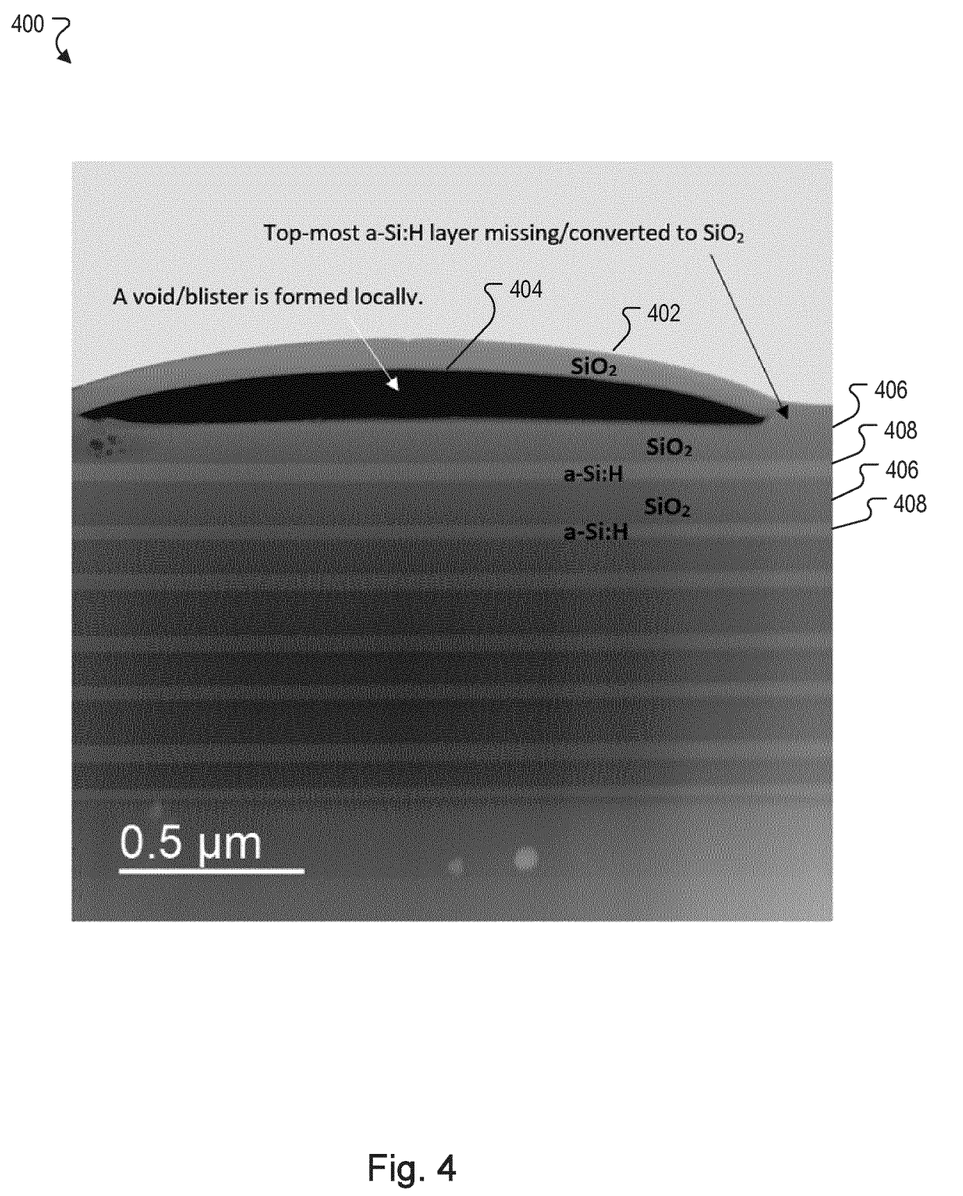
FIG. 4 shows example layers of an interference filter exhibiting instability due to environmental effects.

FIG. 4 shows example layers of an interference filter 400 exhibiting instability due to environmental effects. The interference filter 400 of FIG. 4 can include multiple alternating layers. For example, the interference filter 400 can include a top layer 402 and a layer 404 that is adjacent the top layer 402. In some cases, the top layer 402 is composed of a silicon dioxide ($SiO_2$) material and adjacent layer 404 is composed of a a-Si:H material. The interference filter 400 can further include multiple alternating layers 406, 408. In some implementations, each layer of the alternating layers is formed from a different material than a material used to form an adjacent alternating layer. For example, layer 406 can be composed of a material such as $SiO_2$, whereas layer 408 is composed of a different material such as a-Si:H.

The interference filter 400 can be disposed on a detector 104. In general, signal characteristics of a reflected light wave are detected, measured, and processed based on detection functions of detector 104. However, detectors are often placed in certain locations where environmental conditions at those locations can degrade accurate detection capabilities of a detector. The degraded detection functions cause distorted measurement readings of the reflected light. In general, the degraded detection function occurs in response to instability of the a-Si:H layers when the a-Si:H layers are exposed to certain environmental conditions.

One physical problem that can occur due to the instability is the formation of blisters at the a-Si:H layers which can cause delamination of the layers. For example, adjacent layer 404 of interference filter 400 can exhibit instability such as voids and blisters due to environmental effects. In some cases, the cause of the blistering can be attributed to hydrogen dose or ion energy during implantation, annealing after deposition, or reaction of the a-Si:H layers to water or water vapour in the environment. Further, the hydrogen content that occurs during layer deposition, e.g., plasma enhanced chemical vapor deposition (PECVD) or magnetron sputtering, may also have an influence on the blister formation.

Figure 5:
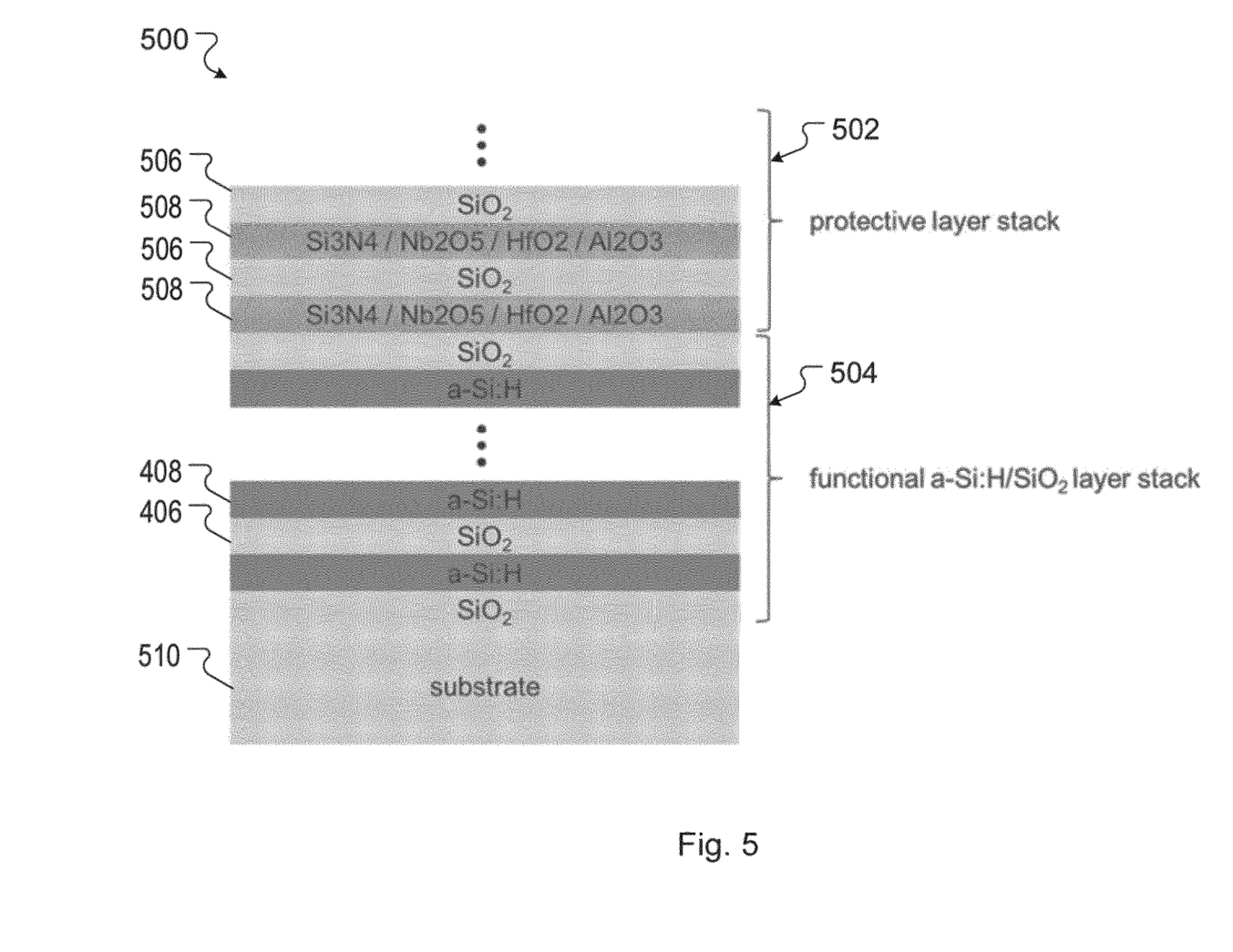
FIG. 5 is a diagram of an example interference filter that includes an example protective layer stack.

FIG. 5 is a diagram of an example interference filter 500 that includes an example protective layer stack. In some implementations, an optical device includes interference filter 500 disposed on detector 104 of the optical device. The interference filter 500 includes a first filter portion 502 and a second filter portion 504. As described here, the first filter portion 502 corresponds to the protective layer stack.

Filter portion 502 has a first set of alternating layers, e.g., that includes layers 506, 508. One layer 506 in the first set of alternating layers is formed from a first material, whereas another layer 508 in the first set of alternating layers is formed from a second, different material. For example, layer 506 can be composed of a material such as $SiO_2$, whereas layer 508 can be composed of a different material. In some implementations, layer 508 can be composed of a variety of different respective materials, such as silicon nitride ($Si_3N_4$), niobium oxide ($Nb_2O_5$), Hafnium(IV) oxide ($HfO_2$), or aluminum oxide ($Al_2O_3$).

Filter portion 504 has a second set of alternating layers, e.g., that includes layers 406, 408 described above. Filter portion 504 can correspond to interference filter 400 or at least to the multiple alternating layers 406, 408 of interference filter 400, where layer 406 is formed from an example material such as $SiO_2$, while layer 408 is formed from a different example material such as a-Si:H. In the implementation of FIG. 5, interference filter 500 is disposed on a substrate 510 which represents a substrate of detector 104, which can be based on CMOS technology. In some cases, the substrate 510 is a glass substrate.

As described herein, the interference filter 500 is operable to attenuate undesired light waves in multiple distinct environments based at least on the multiple alternating layers in the first filter portion 502. The filter portion 502 represents an additional protective layer stack of the interference filter 500. In some implementations, filter portion 502 is an additional layer stack composed of dielectric layers, e.g., alternating dielectric layers. The additional layer stack can be disposed on (or on top of) an example a-Si:H based optical interference filter, such as filter 400 described above. The additional protective layer stack of dielectric layers is operable to improve the overall stability of the interference filter 500 such that the interference filter is resistant to, or has immunity against, certain environmental influences that would otherwise cause physical deformation, including voids and blisters, of the interference filter.

In some implementations, the additional layer stack corresponds to a filter property of the interference filter 500. For example, the filter property is operable to cause the interference filter 500 to have immunity to one or more environmental conditions that would otherwise cause physical deformation of one or more layers included in the multiple alternating layers of the second filter portion 504. For example, the filter property corresponding to the additional layer stack is operable to cause the interference filter 500 to have immunity to certain humidity driven defects.

The additional protective layers are operable to prevent water, water vapour, liquids, fluids, and/or other gaseous or fluid-based elements from reaching a top-most a-Si:H layer or $SiO_2$ layer of the second filter portion 504. In some cases, incorporating additional dense dielectric layers of filter portion 502 on top of interference filter 400 can reduce, substantially reduce, or eliminate possible paths used by gaseous or fluid-based elements that degrade stability of the one or more layers in the filter portion 504. The additional protective layer stack of filter portion 502 can be operable to attenuate undesired light waves and provide immunity to certain environmental effects, while still maintaining high transparency in the near infrared region.

In some implementations, the interference filter is configured for optical applications that focus on light waves near the infrared (IR) spectrum. However, applications of the interference filter using a-Si:H can be further extended into the IR region, for example, if a different detector technology is used. Examples of detector technology that can be used to extend the interference filter into the IR region include silicon-germanium (SiGe) or indium gallium arsenide (InGaAs). For certain sensing applications, an infrared (IR) light source may be used to emit photons that reflect off of an object and are detected by an IR detector of an optical sensing device.

The sensor measures the reflected signal when an object is within a detectable distance from a sensor that includes the IR light source and the IR detector. The sensor uses the reflected signal to determine a color, light range, or motion readout that may be proportional to the measured light signal intensity of the reflected signal. The signal characteristics of the reflected light are detected, measured, and processed based on detection functions of the detector. However, as described above, detectors are often placed in certain locations where environmental conditions at those locations can degrade accurate detection capabilities of a detector.

Other approaches that seek to improve stability of certain layers of an interference filter use solutions that focus on optimizing process conditions during deposition of the a-Si:H layers or direct encapsulation of the layers. However, techniques that include integrating an optically suitable dielectric multilayer protective stack with a fully functional a-Si:H/$SiO_2$ layer stack of an optical interference filter (as described herein) provide a more robust approach to improving stability of the filter's layers. Rather than focus solely on improving intrinsic properties of a-Si:H layers, which can be tedious and strongly dependent on the deposition technique used, the described approach uses protective layer stack deposition that is substantially independent of the hydrogenated amorphous silicon deposition.

The proposed techniques can improve the reliability of interference filters that use a-Si:H as a layer material without having a negative impact on the optical performance of the interference filters. In some cases, the described approach can be implemented easily as an example add-on feature to other existing interference filter solutions.

To construct an example interference filter 500, an alternating stack of a-Si:H and $SiO_2$ thin films can be deposited onto a substrate 510. In some implementations, the substrate 510 is a glass substrate. In other implementations, the substrate 510 is a CMOS-wafer that can represent an example integrated circuit die. For an interference filter that includes filter portion 502, $SiO_2$ can be the material used as a first layer of the interference filter as well as the material used as a last layer material of the interference filter. However, the described techniques are not limited or restricted to this layer scheme. Other layer materials as well as other alternating and non-alternating layer configurations are within the scope of this disclosure. For example, a-Si:H can be the material used as a first layer of the interference filter as well as the material used as a last layer material of the interference filter.

In some implementations, the protective layer stack represented by first filter portion 502 is disposed on the second filter portion 504 by way of deposition. The deposition of the protective layer either can be done during the same deposition run for depositing filter portion 504 on substrate 510, in a different deposition run, or using a different coating equipment. In some implementations, the deposition process results in the optical interference filter being exposed to ambient air prior to deposition of deposition of the protective layer stack represented by filter portion 502.

Figure 6:
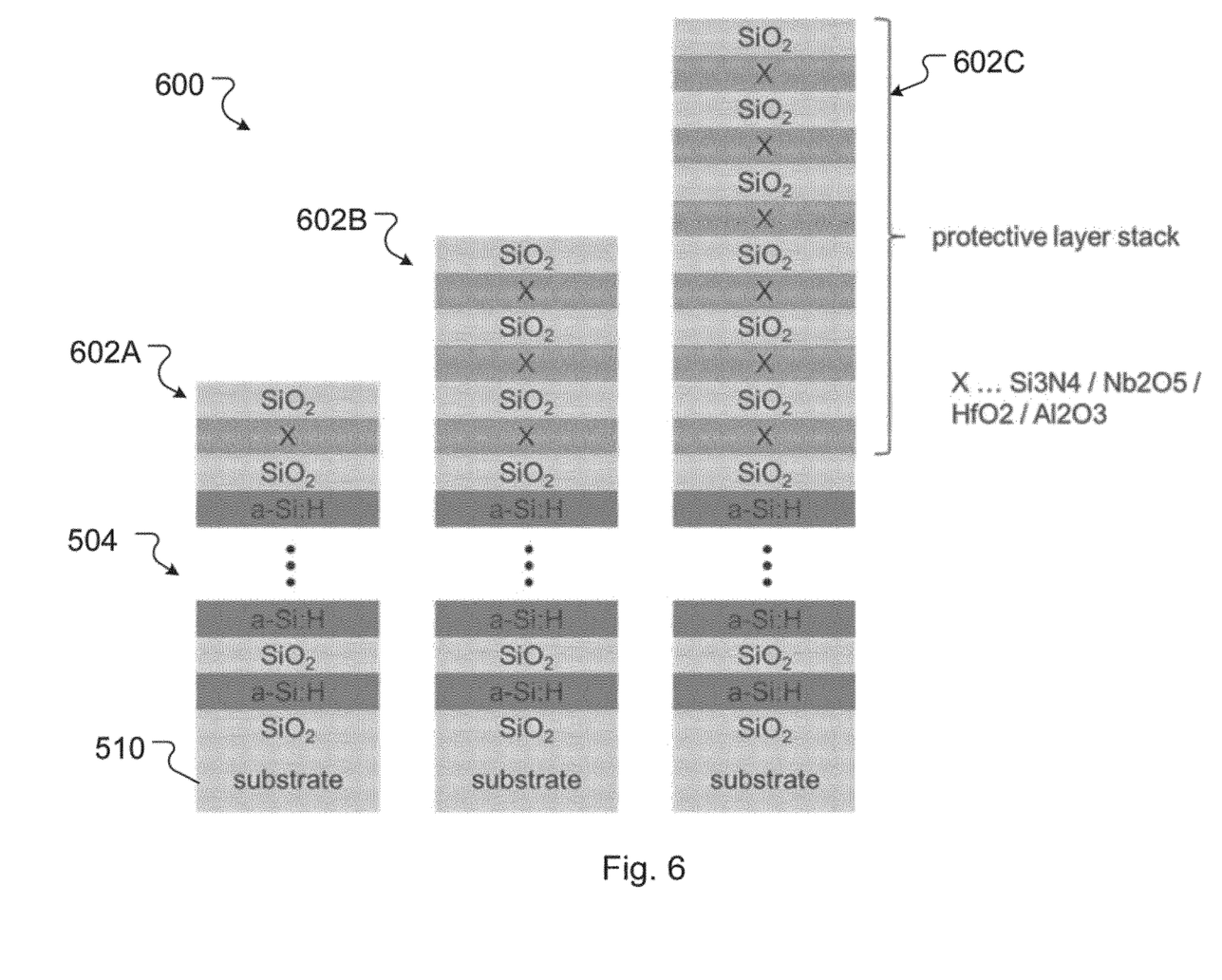
FIG. 6 is a diagram of example interference filters that each include a distinct example protective layer stack.

FIG. 6 is a diagram of example interference filters 600 each of which includes a distinct example protective layer stack 602A, 602B, and 602C. Protective layer stack 602A can include fewer protective layers than layer stack 602B, while protective layer stack 602B can include fewer protective layers than layer stack 602C. As described above, in some cases, one or more of the interference filters 600 can each have up to one hundred fifty protective layers 602 of light refracting material. In other cases, each of one or more of the interference filters 600 can have more than one hundred fifty protective layers 315 of the light refracting material.

In some implementations, each of the protective layer stacks 602A/B/C uses light refracting materials such as $SiO_2$, $Si_3N_4$, $Nb_2O_5$, $HfO_2$, or $Al_2O_3$. In other implementations, each of the protective layer stacks 602A/B/C uses light refracting materials such as silicon monoxide (SiO), titanium dioxide ($TiO_2$), zirconium dioxide ($ZrO_2$), or tantalum pentoxide ($Ta_2O_5$). In these implementations, $SiO_2$ can be used as a low refractive index material (L), while any of the other remaining materials can be used as a high refractive index material (H).

The additional protective layer stack corresponding to filter portion 502 on top of the a-Si:H/SiO2 filter stack (filter portion 504) is part of a final fully assembled optical interference filter 500 or 600. Design options should account for refractive capabilities of the protective layer stack during the filter design phase in order to not degrade optical performance of a final fully assembled optical interference filter. In some implementations, the filter portion 504 that represents the a-Si:H/SiO2 part of the layer stack provides the basic functionality of the optical interference filter. For example, this portion of the interference filter may be required to form a long-pass, a band-pass, a short-pass, or a peak-shaped transmission curve with reference to light waves that interact with these layers of the optical interference filter.

In some implementations, protective stack 602A can include two layers, protective stack 602B can include six layers, and protective stack 602C can include twelve layers. Each stack of protective layers 602A/B/C is comprised of $SiO_2$ layers and layers formed from one of the following materials: $Si_3N_4$, $Nb_2O_5$, $HfO_2$, $Al_2O_3$. Each of protective layers 602 demonstrates a clear improvement to layer stability when compared to interference filter layers that are simultaneously stressed without any protective layers. In some examples, increasing a number of protective layers in a stack, or total thickness of an example protective layer stack, further improves the effectiveness and stability of the protective layer stack and the overall interference filter. In some cases, improvements such as defect-free samples can be achieved depending on the particular type of environment to which the samples were exposed.

Figure 7:
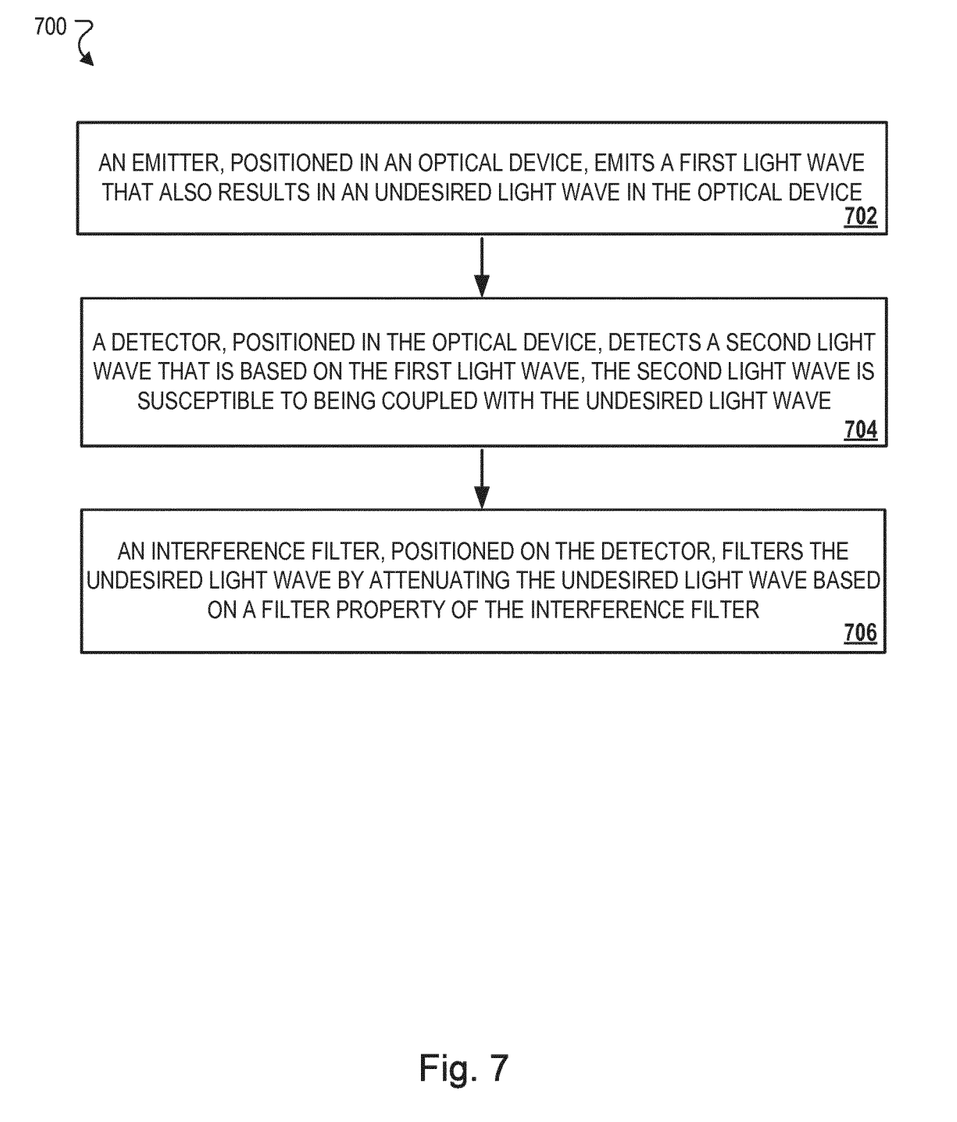
FIG. 7 shows an example process for reducing optical interference using an interference filter.

FIG. 7 shows an example process 700 for reducing optical interference using an interference filter, such as interference filter 310, 500, or 600 described above. In some implementations, process 700 is performed using optical device 306 of system 300 described above. In these implementations, optical device 306 can include one or more of interference filters 310, 500, or 600 described above.

Referring now to the process 700, an emitter disposed in an optical device emits a first light wave (702). The first light wave causes an undesired light wave in the optical device. For example, emitter 102 of optical device 306 generates a signal that corresponds to light wave 220. The emitter 102 can be, for example, an IR LED that has a narrow spectral power density (SPD).

A detector disposed in the optical device detects a second light wave that is based on the first light wave (704). The second light wave is detectable by the detector and is susceptible to being coupled with an undesired light wave that results from the first light wave. For example, detector 104 detects reflected light wave 225 in response to the IR light wave emitted by emitter 102 reflecting off target object 215. In this implementation, reflected light wave 225 is susceptible to being coupled with undesired light waves 235. For example, the SPD of emitter 102 causes light wave 220 to have certain power and/or spectral attributes 230 that cause undesired light waves 235 to occur at optical device 306.

An interference filter 500 disposed on the detector 104 is used to filter the undesired light wave caused by the first light wave (706). Filtering the undesired light wave includes attenuating the undesired light wave based on a filter property of the interference filter. For example, the interference filter can include a first set of alternating layers that are composed of a first set of materials and a second set of alternating layers that are composed of a second set of materials. The filter property corresponds to an additional protective layer stack that is represented by one set of the alternating layers, e.g., the second set of alternating layers.

The filter property is operable to cause the interference filter to attenuate the undesired light wave while being resistant to an environmental condition that would otherwise cause physical deformation of the interference filter. The environmental condition can be based on a temperature of the environment exceeding a threshold temperature, based on water or water vapor that causes humidity in the environment, or based on a process by which the detector 104 was enclosed in a device package.

In some implementations, the additional protective layer stack is comprised of multiple dielectric layers arranged in a stacked configuration and that are disposed on a surface of the detector. The dense dielectric layers that are disposed on the surface of the detector 104 are operable to reduce a number of potential paths through which gaseous or fluid-based elements that degrade stability of the filter layers travel to one or more portions of the interference filter. In some implementations, the dense dielectric layers are disposed on a glass substrate that encloses the detector. The glass substrate may be parallel to a surface of the detector.

In some implementations, optical device 306 is part of a sensing system 300 installed in a host device, such as a mobile smartphone, tablet, in-ear headphones, a wearable device, camera, or other electronic device. In such implementations, the advantages of optical device 306 that pertain to reducing, attenuating, or blocking cross-talk can translate to improved sensing features as well as other detection features at the host device. For example, the optical device 306 may be integrated in a host device, and the reflected light wave signal 225 is processed at the host device to more accurately determine whether the host device is positioned adjacent an ear of a person's head.

In some implementations, the host device receives signals from the detector and uses one or more processing devices to adjust a feature of the host device in response to receiving the signals from the detector. For example, the host device can adjust a brightness of a display screen integrated at the host device, turn off the display screen, or cause the host device to transition from a locked operating state to an unlocked operating state. In some examples, the host device, or circuitry associated with the detector 104, includes one or more processors that are configured to execute instructions to cause performance of operations for adjusting features of the host device in response to receiving the signals from the detector 104.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. In some implementations, the computer programs are used by a controller of a host device (e.g., a smartphone or tablet). For example, the controller uses the programs to control operation of an emitter disposed in the host device and to process signals generated by a detector disposed in the host device. The signals generated by the detector are processed in response to the detector receiving reflected light corresponding to light waves emitted by the emitter.

As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. Further, while this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products. Accordingly, other implementations are within the scope of the following claims.

The invention claimed is:

1. An optical device, comprising:
   an emitter operable to emit a first light wave;
   a detector operable to detect a second light wave that is based on the first light wave, wherein the second light is susceptible to being coupled with an undesired light wave that is based on the first light wave; and
   an interference filter disposed on the detector, the interference filter comprising:
      a first plurality of alternating layers that are formed using a first set of materials;
      and
      a second plurality of alternating layers that are formed using a second set of materials,
         wherein the second plurality of alternating layers corresponds to at least one filter property of the interference filter, and
         the at least one filter property is operable to cause the interference filter to:
            attenuate the undesired light wave;
            be resistant to a first environmental condition that would otherwise cause physical deformation of the first plurality of alternating layers; and
            be resistant to a second, different environmental condition that would otherwise cause physical deformation of the first plurality of alternating layers.

2. The optical device of claim 1, wherein the second plurality of alternating layers represents an additional layer stack of the interference filter, the additional layer stack being comprised of a plurality of dielectric layers arranged in a stacked configuration.

3. The optical device of claim 2, wherein the additional layer stack corresponds to the filter property, the filter property being operable to cause the interference filter to have immunity to one or more environmental conditions that would otherwise cause physical deformation of one or more layers included in the first plurality of alternating layers.

4. The optical device of claim 1, wherein:
   the second plurality of alternating layers includes a plurality of dense dielectric layers arranged in a stacked configuration; and
   each dense dielectric layer of the plurality of dense dielectric layers is disposed on a surface of the detector.

5. The optical device of claim 4, wherein the dense dielectric layers that are disposed on the surface of the detector are operable to reduce a number of potential paths through which water or water vapor travels to one or more portions of the interference filter.

6. The optical device of claim 1, wherein:
   the filter property is operable to cause the interference filter to attenuate the undesired light wave based on an angle of reflection of the undesired light wave, the angle of reflection of the undesired light wave being relative to a surface of the detector.

7. The optical device of claim 1, wherein:
   the first environmental condition is based on water or water vapor; and
   the second, different environmental condition is based on a particular type of fluid or gas.

8. The optical device of claim 7, wherein:
the first environmental condition is based on a temperature of the environment exceeding a threshold temperature; and
the second, different environmental condition is based on a process by which the detector was enclosed in a device package.

9. The optical device of claim 1, wherein the filter property of the interference filter is based on a composition of layers that form a protective layer stack using the second plurality of alternating layers.

10. The optical device of claim 1, wherein:
the interference filter includes a protective layer stack formed using the second plurality of alternating layers; and
the optical device is a sensor operable to detect Information about a target object relative to the optical device.

11. A host device comprising an optical device as in claim 1, the host device comprising:
one or more processing devices; and
one or more non-transitory machine-readable storage devices storing instructions that are executable by the one or more processing devices to cause performance of operations comprising:
receiving one or more Signals from the detector; and
adjusting a feature of the host device in response to receiving the one or more signals from the detector.

12. A method performed using an optical device, the method comprising:
emitting, by an emitter disposed in the optical device, a first light wave that results in an undesired light wave in the optical device;
detecting, by a detector disposed in the optical device, a second light wave that is based on the first light wave, wherein the second light wave is susceptible to being coupled with the undesired light wave; and
filtering, using an interference filter disposed on the detector, the undesired light wave caused by the first light wave, wherein filtering the undesired light wave comprises attenuating the undesired light wave based on at least one filter property of the interference filter, the at least one filter property being operable to cause the interference filter to:
attenuate the undesired light wave; and
have resistance to a first environmental condition that would otherwise cause physical deformation of the first plurality of alternating layers; and
have resistance to a second, different environmental condition that would otherwise cause physical deformation of the first plurality of alternating layers.

13. The method of claim 12, wherein attenuating the undesired light wave based on the filter property of the interference filter comprises:
attenuating the undesired light wave using a plurality of alternating layers that represent an additional layer stack of the interference filter.

14. The method of claim 13, wherein:
the additional layer stack is comprised of a plurality of dielectric layers arranged in a stacked configuration, and
the plurality of dielectric layers are operable to cause the interference filter to have resistance to one or more environmental conditions that would otherwise cause physical deformation of the interference filter.

15. An optical device, comprising:
an emitter operable to emit a first light wave;
a detector operable to detect a second light wave that is based on the first light wave; and
an interference filter disposed on the detector, the interference filter comprising:
a first plurality of alternating layers that are formed using a first set of materials; and
a second plurality of alternating layers that are formed using a second set of materials, the second plurality of alternating layers represents a protective layer stack of the interference filter,
wherein the second plurality of alternating layers corresponds to at least one filter property of the interference filter, and
the at least one filter property is operable to cause the interference filter to:
attenuate an undesired light wave;
be resistant to a first environmental condition that would otherwise cause physical deformation of the first plurality of alternating layers; and
be resistant to a second, different environmental condition that would otherwise cause physical deformation of the first plurality of alternating layers.

16. The optical device of claim 15, wherein at least one material in the first set of materials comprises amorphous Silicon or hydrogenated amorphous Silicon; and
wherein at least one material in the second set of materials has a refractive index that is lower than a respective refractive index of the amorphous Silicon or the hydrogenated amorphous Silicon.

* * * * *